US012203426B2

(12) United States Patent
Sullivan et al.

(10) Patent No.: US 12,203,426 B2
(45) Date of Patent: Jan. 21, 2025

(54) COOLING SYSTEM FOR AIR-COOLED ENGINE

(71) Applicant: Briggs & Stratton, LLC, Wauwatosa, WI (US)

(72) Inventors: Ryan A. Sullivan, West Bend, WI (US); Gary S. Johnson, Hales Corners, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 0 days.

(21) Appl. No.: 18/210,782

(22) Filed: Jun. 16, 2023

(65) Prior Publication Data

US 2023/0332557 A1 Oct. 19, 2023

Related U.S. Application Data

(63) Continuation of application No. 17/748,689, filed on May 19, 2022, now Pat. No. 11,692,506, which is a (Continued)

(51) Int. Cl.

| | |
|---|---|
| ***F01P 1/00*** | (2006.01) |
| ***F01P 1/02*** | (2006.01) |
| ***F01P 5/02*** | (2006.01) |
| ***F01P 5/04*** | (2006.01) |
| ***F01P 11/12*** | (2006.01) |
| ***F02B 75/00*** | (2006.01) |
| ***F02B 75/22*** | (2006.01) |

(Continued)

(52) U.S. Cl.

CPC ................ *F02F 7/007* (2013.01); *F01P 1/00* (2013.01); *F01P 1/02* (2013.01); *F01P 5/02* (2013.01); *F01P 5/043* (2013.01); *F01P 11/12* (2013.01); *F02B 75/007* (2013.01); *F02B 75/22* (2013.01); *F02B 2075/1808* (2013.01)

(58) Field of Classification Search

CPC .. F02F 7/007; F02F 7/0021; F02F 1/28; F02F 1/04; F01P 1/00; F01P 1/02; F01P 5/02; F01P 5/043; F01P 5/06; F01P 7/02; F01P 11/12; F01P 11/14; F01P 2001/023; F01P 2001/026; F02B 75/007; F02B 75/22; F02B 2075/1808

See application file for complete search history.

(56) References Cited

U.S. PATENT DOCUMENTS 3,252,449 A 5/1966 Couchman, Jr. et al.
4,156,409 A 5/1979 Nakano
(Continued)

FOREIGN PATENT DOCUMENTS

WO WO-2011/068446 A1 6/2011

OTHER PUBLICATIONS

Briggs & Stratton, Commercial Turf Series, Operator's Manual, 2013, 32 pages.
Briggs & Stratton, Vanguard, Operator's Manual, 2012, 28 pages.

*Primary Examiner* — Grant Moubry
(74) *Attorney, Agent, or Firm* — Foley & Lardner LLP

(57) ABSTRACT

A method of operating a fan for an air-cooled internal combustion engine includes starting the air-cooled internal combustion engine, operating the fan in a first operating mode in which the fan rotates in a first direction, and operating the fan in a second operating mode in which the fan rotates in a second direction.

19 Claims, 8 Drawing Sheets

Related U.S. Application Data continuation of application No. 16/562,580, filed on Sep. 6, 2019, now Pat. No. 11,365,703, which is a continuation of application No. 15/352,443, filed on Nov. 15, 2016, now Pat. No. 10,443,538, which is a continuation of application No. 14/035,469, filed on Sep. 24, 2013, now Pat. No. 9,500,117.

(60) Provisional application No. 61/777,947, filed on Mar. 12, 2013.

(51) Int. Cl.
*F02F 7/00* (2006.01)
*F02B 75/18* (2006.01)

(56) References Cited

U.S. PATENT DOCUMENTS

| | | | | |
|---|---|---|---|---|
| 4,841,920 | A | 6/1989 | Andreasson et al. | |
| 4,977,862 | A | 12/1990 | Aihara et al. | |
| 5,542,380 | A | 8/1996 | Chatten | |
| 7,066,114 | B1 * | 6/2006 | Hannesen | F01P 7/048 123/41.1 |
| 7,069,896 | B2 | 7/2006 | Tsunoda et al. | |
| 7,201,132 | B2 | 4/2007 | Miyake et al. | |
| 7,225,765 | B2 | 6/2007 | Leech et al. | |
| 7,303,034 | B1 | 12/2007 | Knuth | |
| 7,363,885 | B2 | 4/2008 | Miyake et al. | |
| 7,409,931 | B2 | 8/2008 | Kochi et al. | |
| 7,412,961 | B2 | 8/2008 | Doring | |
| 7,475,657 | B2 | 1/2009 | Dopke et al. | |
| 7,950,355 | B2 | 5/2011 | Nakamizo | |
| 7,958,855 | B2 | 6/2011 | Nakamizo | |
| 8,424,498 | B2 | 4/2013 | Tiefenthaler et al. | |
| 8,720,392 | B2 | 5/2014 | Tiefenthaler et al. | |
| 8,812,189 | B2 | 8/2014 | Sandel | |
| 2003/0037757 | A1 | 2/2003 | Osband | |
| 2003/0236595 | A1 | 12/2003 | Frankel et al. | |
| 2004/0025827 | A1 | 2/2004 | Davis | |
| 2006/0191500 | A1 | 8/2006 | Sugiyama et al. | |
| 2007/0209612 | A1 * | 9/2007 | Kojima | F02N 11/0818 123/179.4 |
| 2008/0108032 | A1 * | 5/2008 | Tuhy | F01P 5/043 434/245 |
| 2008/0136357 | A1 * | 6/2008 | Beck | F01P 11/12 318/280 |
| 2009/0293821 | A1 * | 12/2009 | Nakamizo | F01P 5/06 123/41.65 |
| 2010/0155036 | A1 * | 6/2010 | Andris | F01P 7/164 700/282 |
| 2011/0114044 | A1 | 5/2011 | Dees et al. | |
| 2012/0277951 | A1 * | 11/2012 | Sandel | B62J 50/30 180/68.1 |
| 2012/0330496 | A1 | 12/2012 | Eser et al. | |
| 2014/0261259 | A1 | 9/2014 | Sullivan et al. | |

* cited by examiner

COOLING SYSTEM FOR AIR-COOLED ENGINE

CROSS-REFERENCE TO RELATED PATENT APPLICATIONS

This application is a continuation of U.S. patent application Ser. No. 17/748,689, filed May 19, 2022, which is a continuation of U.S. patent application Ser. No. 16/562,580, filed on Sep. 6, 2019, which is a continuation of U.S. patent application Ser. No. 15/352,443, filed on Nov. 15, 2016, which is a continuation of U.S. patent application Ser. No. 14/035,469, filed on Sep. 24, 2013, which claims the benefit of U.S. Provisional Application No. 61/777,947, filed Mar. 12, 2013, all of which are hereby incorporated by reference in their entireties.

BACKGROUND

The present invention relates generally to the field of cooling systems for air-cooled internal combustion engines.

Many air-cooled engines include a blower housing and a rotating screen. The rotating screen is positioned over a flywheel and a fan coupled to the crankshaft of engine. As the engine operates, the flywheel, the fan, and the rotating screen rotate with the crankshaft. Under this configuration, cooling air is drawn into the blower housing to cool the engine, while the rotating screen acts to prevent debris from entering blower housing and/or to break or cut any debris entering the blower housing into relatively small pieces. Because of the rotation of rotating screen, debris is not able to quickly build up on the rotating screen and restrict airflow across the engine. However, there may be instances where access to moving parts of the engine, including a rotating screen, must be restricted. Also, the rotating screen may restrict air flow into the blower housing.

Additionally, in many air-cooled engines, the flywheel, the fan, and the rotating screen are coupled to the crankshaft of engine to rotate when the engine is operational. However, due to this coupling, the fan, and the rotating screen are only able to rotate in one direction and are only operational when engine is running. Additionally, because the fan is coupled to the crankshaft, the location and orientation of the fan is limited by the location of the crankshaft.

In engine configurations that do not require the ignition trigger coils to be located adjacent the flywheel (e.g., electronic fuel injection systems), the exact placement of the ignition trigger coils may be varied without adversely affecting the operation of the engine. Some engine manufacturers mount the ignition trigger coils externally on a side of the engine/blower housing. However, this placement opens the ignition trigger coils up to debris and incidental contact.

It would be advantageous to provide a cooling system for an air-cooled internal combustion engine that effectively restricts access to moving parts while still allowing for sufficient airflow and debris management.

SUMMARY

One embodiment of the invention relates to a method of operating a fan for an air-cooled internal combustion engine. The method includes starting the air-cooled internal combustion engine, operating the fan in a first operating mode in which the fan rotates in a first direction, and operating the fan in a second operating mode in which the fan rotates in a second direction.

One embodiment of the invention relates to a method of operating a fan for an air-cooled internal combustion engine. The method includes starting the air-cooled internal combustion engine, determining if the fan operates in a first operating mode in which the fan rotates in a first direction or a second operating mode in which the fan rotates in a second direction, upon operating the fan in one of the first operating mode or the second operating mode, monitoring an input condition while the air-cooled internal combustion engine is running, detecting a change in the input condition and switching the fan from the one of the first operating mode or the second operating mode to another of the first operating mode or the second operating mode, determining if the air-cooled internal combustion engine is turned off, and upon determining that the air-cooled internal combustion engine is turned off, operating the fan in a shutdown mode.

One embodiment of the invention relates to a method of operating a fan for an air-cooled internal combustion engine. The method includes starting the air-cooled internal combustion engine, after starting the air-cooled internal combustion engine: operating a first fan in a cooling mode where the first fan rotates in a first direction, and operating a second fan in a debris-removal mode where the second fan rotates in a second direction opposite to the first direction.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

The present invention relates to a cooling system for an air-cooled internal combustion engine. Embodiments of a cooling system in accordance with the present application include a static screen used to shield moving parts of the engine while minimizing airflow restriction and/or one or more electric cooling fans which may be operated in two directions—forward to draw cooling air into and around the engine, and reverse to blow debris away from the air intake vents.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
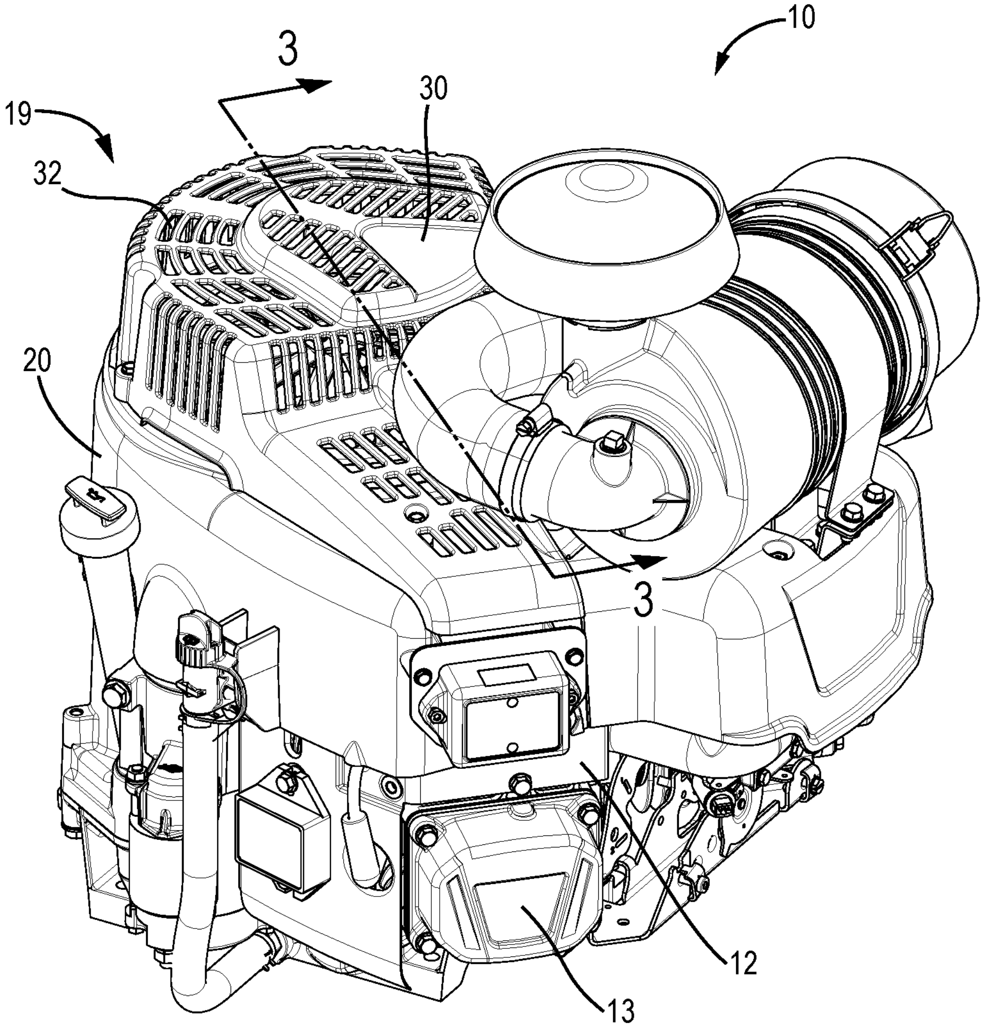
FIG. 1 is a perspective view of an air-cooled internal combustion engine, according to an exemplary embodiment.
Figure 2:
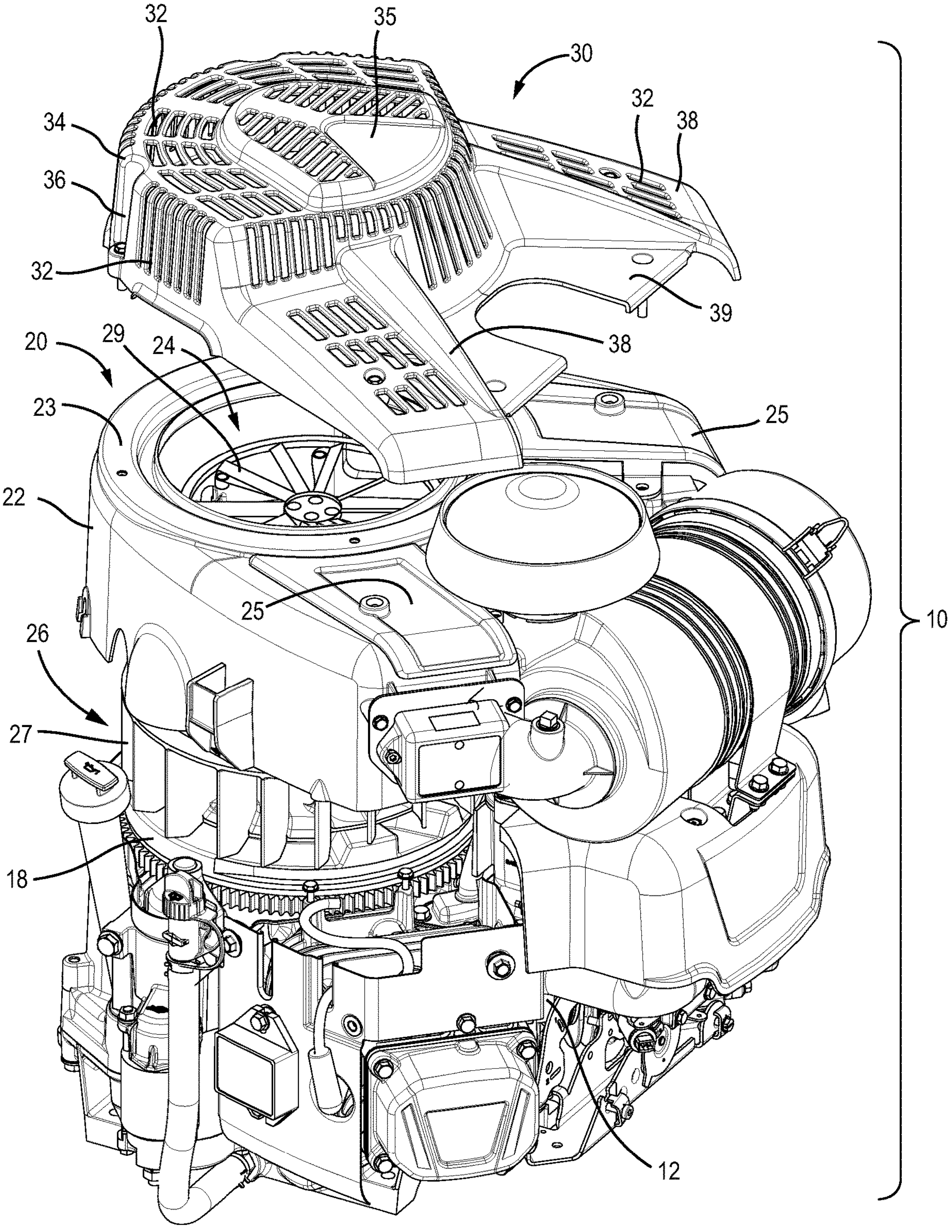
FIG. 2 is an exploded perspective view of the air-cooled internal combustion engine of FIG. 1, including a centrifugal fan coupled to the flywheel.
Figure 3:
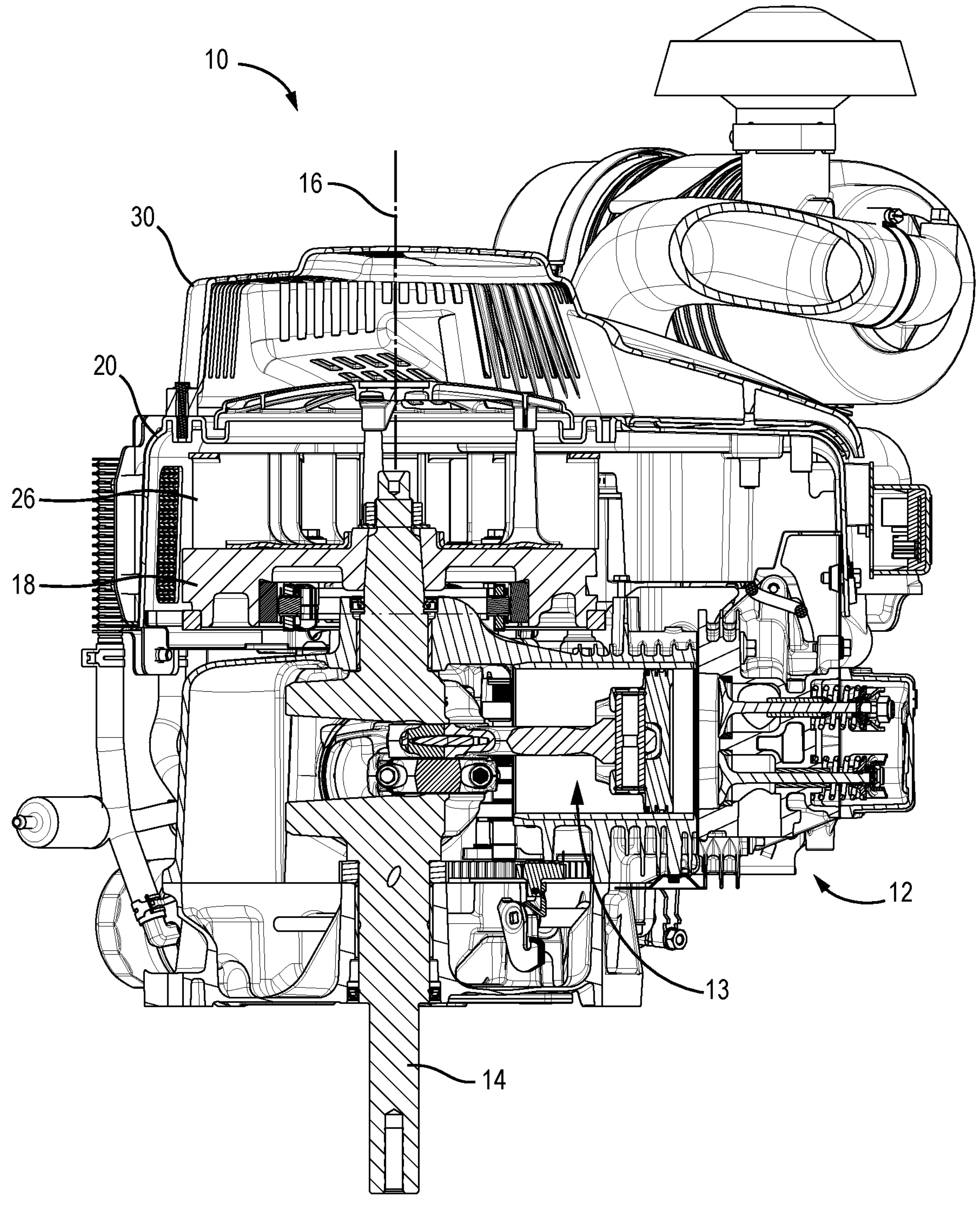
FIG. 3 is a cross section view of the air-cooled internal combustion engine along line 3-3 of FIG. 1.

Referring to FIGS. 1-3, an internal combustion engine is shown according to an exemplary embodiment as a small, gasoline-powered, four-stroke cycle engine 10. The engine 10 includes pistons moveable within cylinders 13 formed in an engine block 12. The reciprocating motion of the pistons rotates a crankshaft 14 about an axis 16 (see FIG. 3). A flywheel 18 is coupled to the crankshaft 14 and is positioned near the top of the engine 10, above the engine block 12. According to an exemplary embodiment, the engine 10 includes two cylinders 13 arranged in a V-twin configuration. However, a broad range of engines and other fluid holding components may benefit from the teachings disclosed herein. For example, in some contemplated embodiments, the engine may include a single cylinder or three, or more cylinders in any of a number of different configurations (e.g., inline, horizontally opposed, etc.), or may have a two-stroke cycle. In some embodiments, the engine 10 is vertically shafted (as shown in FIG. 1), while in other embodiments, the engine may be horizontally shafted. The engine 10 may be configured to power a broad range of equipment, including walk behind lawn mowers, zero-turn radius mowers, lawn tractors, pressure washers, electric generators, snow throwers, and other outdoor power equipment.

The engine 10 further includes a blower assembly 19 configured to direct air to the engine block 12 to cool the engine 10 by removing waste heat from the engine block 12. As shown in FIG. 3, the blower assembly 19 includes a blower housing 20 (e.g., engine cover, engine shroud, etc.) coupled to the top of the engine 10. The blower housing 20 includes a main body or central portion 22 forming an opening 24 through which the air passes to the engine block 12. According to an exemplary embodiment, the blower housing 20 is configured for use with the engine 10 having a V-twin arrangement and may be shaped to generally conform with the shape of the engine block 12. The central portion 22 is aligned with the crankshaft 14. The blower housing 20 may therefore further include two angled arms 25 extending outward from the central portion 22 that are generally aligned with the cylinders of the engine 10. Alternatively, for a single cylinder engine, the blower housing 20 includes a single arm 25.

The blower assembly 19 may be an active system with components that draw air in through a static cover 30 and the blower housing 20 to cool the engine. According to one exemplary embodiment illustrated in FIG. 2, the blower assembly 19 includes a blower fan, shown as a centrifugal fan 26, and an optional rotating screen (shown as blade-style rotating screen 29), both of which are coupled to the flywheel 18. The centrifugal fan 26 rotates about the same axis 16 as the flywheel 18. The centrifugal fan 26 includes a multitude of fan blades 27 configured to discharge a cooling airflow through an airspace defined between the engine block 12 and the blower housing 20. The fan blades 27 each include an inner or leading edge defining a central inlet through which axially directed air is drawn. The cooling airflow is discharged from the centrifugal fan 26 in a radially outward direction past the trailing edges of the respective fan blades, and into the airspace between the engine block 12 and the blower housing 20.

The rotating screen 29 includes a central hub and blades extending outward from the hub to an outer band. The hub, the blades, and the outer band may all be interconnected and integrally formed as a single unitary piece by a suitable process, such as injection molding or casting. In an exemplary embodiment, the rotating screen 29 included between 4 and 16 blades. According to the embodiment illustrated in FIG. 2, the rotating screen 29 includes 12 blades.

The blades each include a root adjacent the hub and a tip spaced outwardly from the root. In one embodiment, the blades may extend outward in a radial direction (i.e. without skew). In another embodiment, the blades may include a forward or backward skew or the blades may intersect the hub in a substantially tangential manner. The radial distance between the rotational axis of the rotating screen and the tips of the respective blades is defined as the maximum blade radius of the rotating screen, while the radial distance between the root and the tip of each blade is defined as the blade span. Several characteristics of the blade may vary over the span. The blades further include a leading edge between the root and the tip and a trailing edge between the root and the tip relative to the direction of rotation of the rotating screen (e.g., a clockwise rotational direction).

The blade-style rotating screen 29 is further described in commonly-owned U.S. patent application Ser. No. 13/592,803 filed on Aug. 23, 2012, which is incorporated herein by reference in its entirety.

The engine 10 still further includes the static cover 30 (e.g., stationary screen, grill, non-rotating screen, etc.) that is coupled to the blower housing 20. The static cover 30 includes multiple intake openings 32 that allow air to pass through the static over 30 but restrict the intake of debris (e.g., leaves, grass clippings, sticks, etc.). A rotating screen may be coupled to the crankshaft and provided below the static cover 30. The static cover 30 prevents access to moving components of the engine 10 (e.g., the crankshaft 14, the flywheel 18, the rotating screen, fans, etc.).

Figure 4:
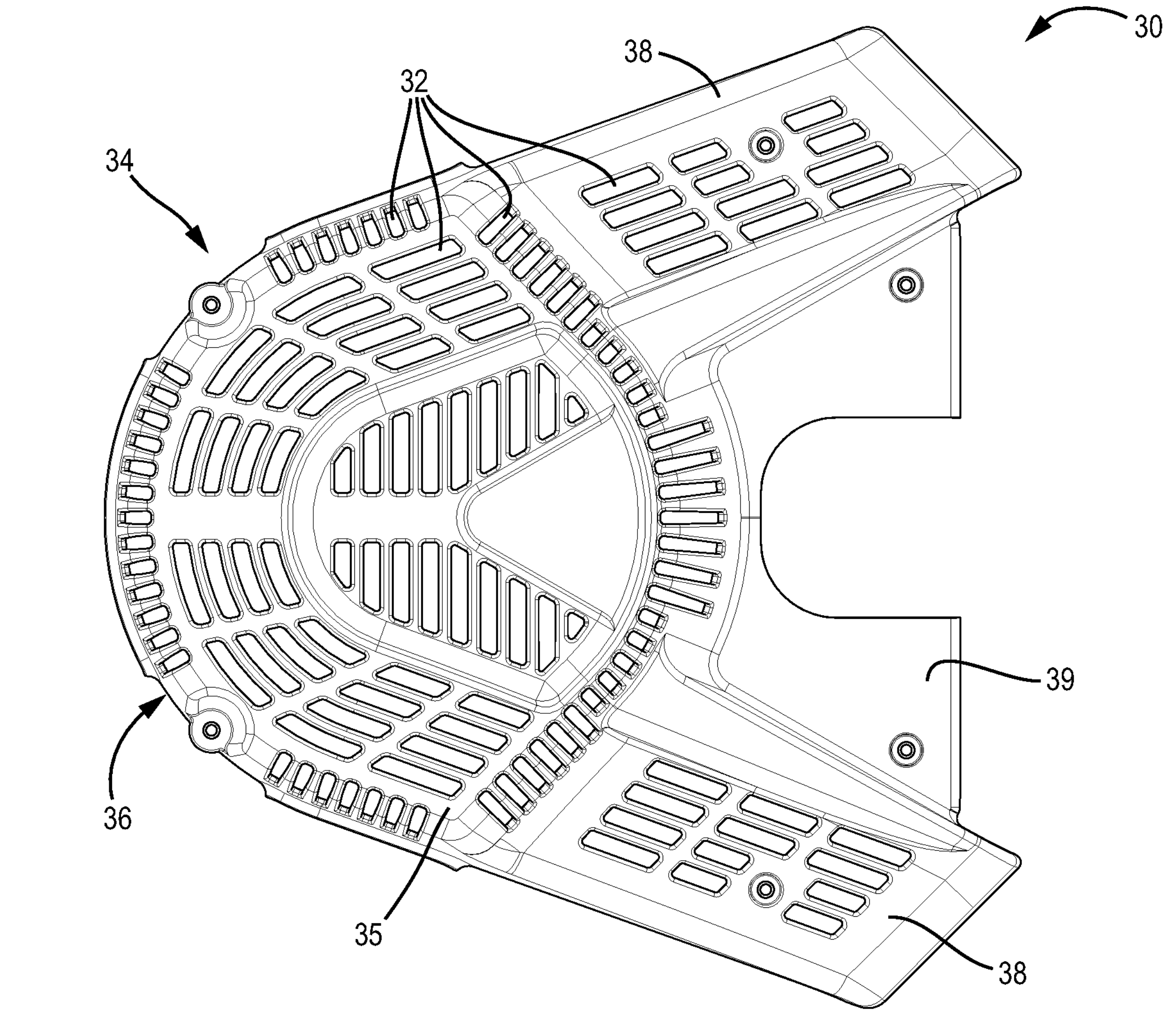
FIG. 4 is a top plan view of the static cover of the air-cooled internal combustion engine of FIG. 1.
Figure 5:
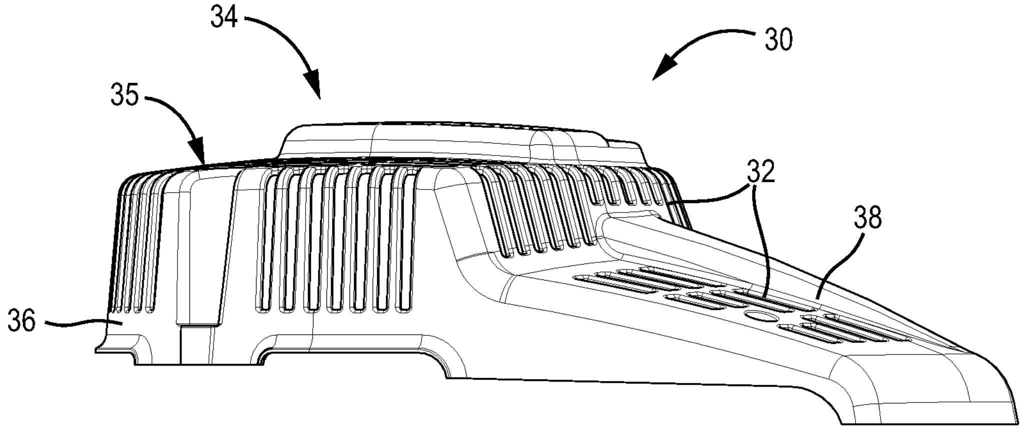
FIG. 5 is a side profile view of the static cover of the air-cooled internal combustion engine of FIG. 1.

According to an exemplary embodiment, and shown in more detail in FIGS. 4-5, the static cover 30 is formed in a "V" shape and includes a roughly cylindrically shaped central portion 34 (e.g., main body) with a top 35 and sidewalls 36. The static cover 30 further includes a pair of arms 38 extending outward from the sidewalls 36 and a flange 39 extending between the arms 38 and the central portion 34. The static cover 30 may be formed as a single body (i.e., as a unitary component) or may include multiple separate portions. As shown in FIG. 2, the static cover 30 is fastened to an annular flange 23 on the blower housing 20 surrounding the opening 24 and to the arms 25 of the blower housing 20 by conventional fasteners (e.g., screws); however, other suitable fastening means may be employed. For example, the static cover 30 may be coupled to the blower housing 20 with a snap fit using integrally formed fastening features. The static cover 30 is configured to be removable from the blower housing 20. When the static cover 30 is removed from the blower housing 20, a user can access various portions of the engine 10 such as the fan, flywheel, the rotating screen, etc. Access doors may be provided on the blower housing 20 to allow the user even greater access to portions of engine 10 underneath the blower housing 20 without necessitating the removal of the blower housing 20.

The air intake openings 32 of the static cover 30 are not only positioned above the fan/flywheel region of the engine 10, but also over the respective cylinders of the engine 10. The intake openings 32 may be formed on any surface of the static cover, including the top 35, the sidewalls 36, or the arms 38. This additional coverage over the respective cylinders of the engine 10 allows for the static cover 30 to includes a greater number of air intake openings 32, which allows for more potential air flow into the blower housing 20. While air intake openings 32 are shown as slots being formed in a grill-like manner, the static cover 30 is not limited to such a formation. According to other exemplary embodiments, the air intake openings 32 may be slots arranged in other patterns or may be another shape that allow for a sufficient airflow into the blower housing 20 while preventing access to the moving parts and limiting the intake of debris (e.g., perforations, holes, openings, apertures, mesh, a screen, etc.).

In the embodiment illustrated in FIG. 1-3, rotation of the centrifugal fan 26 with the flywheel 18 and the crankshaft 14 about the axis 16 draws air in through the air intake openings 32 in the static cover 30 and into the blower housing 20. The air is discharged from the centrifugal fan 26 into the airspace between the engine block 12 and the blower housing 20. The centrifugal fan 26 is coupled to the flywheel 18 and therefore operates concurrently with operation of the engine 10. In some embodiments, air discharged from the centrifugal fan 26 may be directed to other engine locations, including toward an air cleaner and/or toward an engine air intake. For example, air may be directed toward a cyclonic air cleaner assembly as described in commonly-owned U.S. Pat. No. 8,241,378, which is incorporated herein by reference in its entirety. The static cover 30 does not rotate and allows air to pass through the intake openings 32 while preventing an operator from touching or otherwise contacting rotating components (e.g., the centrifugal fan 26 or the flywheel 18) and restricting the intake of debris into the airspace between the engine block 12 and the blower housing 20. Including air intake openings 32 on the top 35, the sidewalls 36 and the arms 38 of the static cover 30 increases the potential intake area and increases the likelihood that air will be able to be drawn into the blower housing 20 by the centrifugal fan 26 in the event that there is partial blockage of some of the air intake openings 32 by debris.

Mesh-style rotating screens having relatively small openings in the screen (e.g., multiple openings each about 0.14 to about 0.23 inches in diameter providing total open areas of about 25 to 32 square inches) substantially restrict air flow through the blower assembly. When such a mesh-style rotating screen is used in combination with a guard or cover formed as a wire cage with large openings (i.e., larger than the air intake openings 32), the mesh-style rotating screen is the restriction point for the blower assembly. These large openings may not completely prevent user access to the moving parts of the engine.

The static cover 30 provides significantly more open area than the mesh-style rotating screens described above while preventing user access to the moving parts of the engine. In one embodiment, the static cover 30 provides 42.58 square inches of open area. This increase in open area is achieved by providing air intake openings 32 in the sidewalls 36 and the arms 38 of the static cover. For example, the static cover 30 provides about 56% more open area than a similar static cover in which air intake openings are only formed in the top of the central portion. This similar static cover may be known as "top hat" cover. Providing air intake openings 32 in the arms 38 also helps to minimize the overall height of the static cover 30 by providing air intake openings 32 in locations other than the central portion 34. A similar static cover with air intake openings only in the central portion would likely need to have a relatively large overall height in order to provide the necessary airflow through the blower assembly.

The combination of the blade-style rotating screen 29 and the static cover 30 reduces the restriction of air flow through the blower assembly 19 as compared to previous cooling systems for air-cooled engines. The restriction point for this combination is the static cover 30, which has greater open area than mesh-style rotating screens (the restriction point in other blower assembly), thereby restricting air flow through the blower assembly 19 less than a mesh-style rotating screen. The blade-style rotating screen 29 has little to no impact on the overall restriction of air-flow through the blower assembly 19 when used in combination with the static cover 30.

Figure 6:
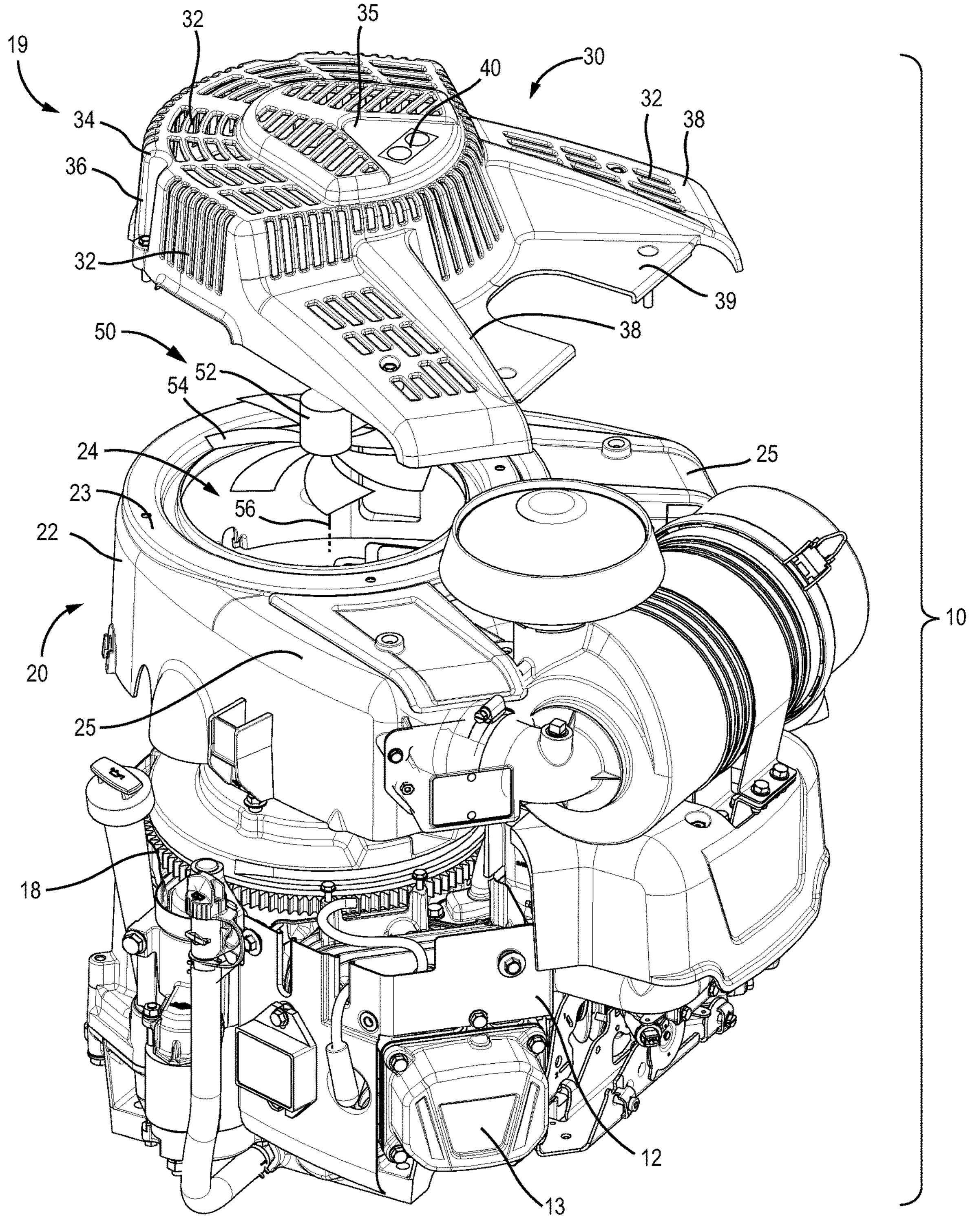
FIG. 6 is an exploded perspective view of an air-cooled internal combustion engine, according to another exemplary embodiment.

Referring now to FIG. 6, the engine 10 is shown including a blower assembly 19 according to another exemplary embodiment. The blower assembly 19 includes a blower fan, shown as the fan 50 provided between the static cover 30 and the engine block 12. In some embodiments, the blower assembly 19 may further include a rotating screen coupled to the crankshaft 14 as described above with reference to FIG. 2. In one embodiment, the fan 50 is an electric fan that includes an electric motor 52 and a multitude of fan blades 54. The fan 50 may be mounted to any stationary component of the engine 10, including, but not limited to, the engine block 12, the blower housing 20, or the static cover 30. The electric motor 52 rotates the fan blades 54 about an axis 56 that is independent of the crankshaft 14. The fan 50 does not need to be placed directly above the crankshaft 14, as the rotation of fan blades 54 is not related to the rotation of the crankshaft 14 (i.e., the axis of rotation 56 need not be collinear with the axis of rotation of the crankshaft 14). According to an exemplary embodiment, the fan 50 is a propeller-type fan that creates a moving column of air parallel to the axis 56. The fan 50 can be mounted in a position that is tilted or angled out of the horizontal plane to direct the column of air to allow for greater airflow to specific parts of the engine 10.

The fan 50 may be operated in a cooling mode or in a debris-removal mode. In an exemplary embodiment, the engine 10 may include a user input device 40 configured to allow a user to manually switch the fan 50 between the cooling mode or the debris-removal mode. While the user input device 40 is shown in FIG. 6 as a panel including multiple buttons, in other embodiments the user input device 40 may be any suitable device, such as a switch, dial, touchscreen, etc.

Figure 7:
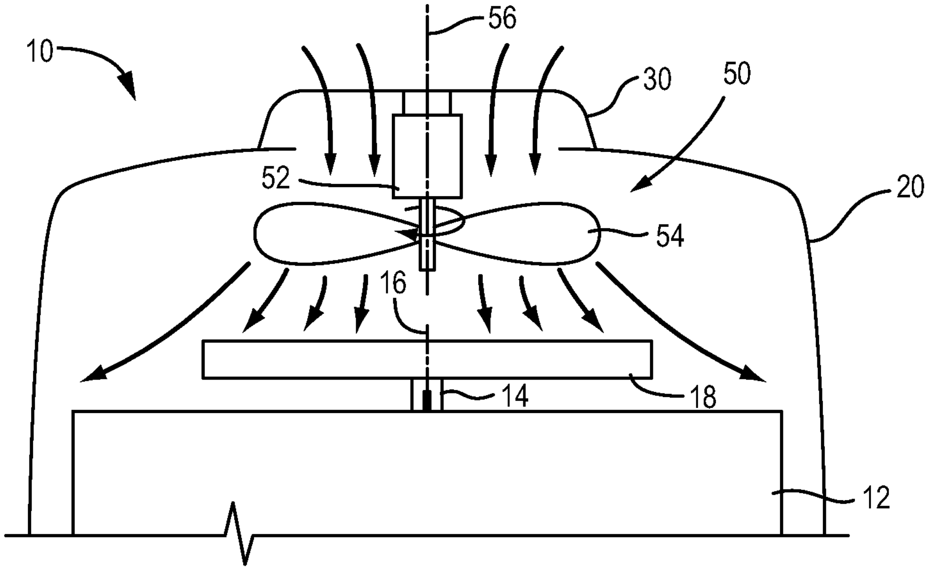
FIG. 7 is a schematic cross-section view of the engine of FIG. 6 with the fan operating in a cooling mode.

In the cooling mode, the motor 52 is configured rotate the fan blades 54 in a first direction (e.g., clockwise) to move air into the blower assembly 19 through an airspace defined between the engine block 12 and the blower housing 20. Referring to FIG. 7, rotation of the fan 50 about the axis 56 in the cooling mode draws air in through the air intake openings 32 in the static cover 30 and into the blower housing 20. The air is discharged downward into the airspace between the engine block 12 and the blower housing 20. The fan 50 is not coupled to the flywheel 18 and may therefore operate independently of the operation of the engine 10 and is not driven by the flywheel 18, the crankshaft 14, or by other components related to the internal combustion process (e.g., camshaft, pistons, etc.). The static cover 30 does not rotate and allows air to pass through the intake openings 32 while preventing an operator from touching or otherwise contacting rotating components such as the fan 50 or the flywheel 18 and restricting the intake of debris into the airspace between the engine block 12 and the blower housing 20.

Figure 8:
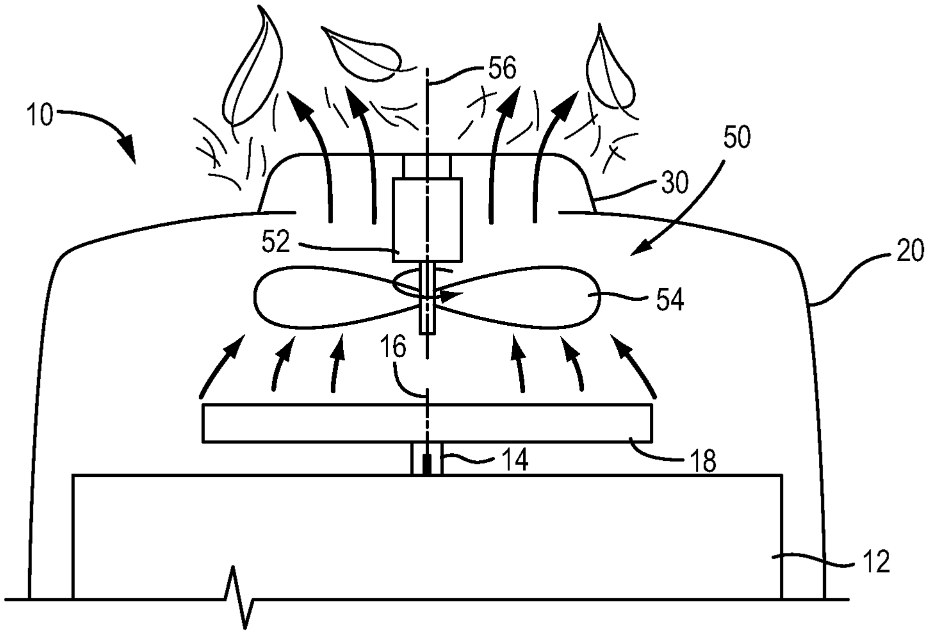
FIG. 8 is a schematic cross-section view of the engine of FIG. 6 with the fan operating in a debris-clearing mode.

Operation of the fan 50 in the cooling mode may cause debris to collect over the air intake openings 32 on the top 35, the sidewalls 36, and/or the arms 38 of the static cover 30. If the engine 10 is run for an extended period of time with the fan 50 in the cooling mode, the blockage of the air intake openings 32 can reduce the potential airflow into the blower housing 20 and reduce the cooling capabilities of the fan 50. If the engine 10 is positioned on a vehicle out of sight of the operator (e.g., on a typical zero-turn mower with the engine mounted behind the operator), debris may collect on a static screen without the knowledge of the operator. Referring to FIG. 8, in the debris-removal mode, the motor 52 is configured to rotate the fan blades 54 in an opposite second direction (e.g., counterclockwise) to move air out of the blower assembly 19. The air is discharged upward, toward the static cover 30 and outward through the air intake openings 32, dislodging any debris from the outside surface of the static cover 30.

The rotational speed of the fan 50 may be altered depending upon the temperature of the engine. For example, a sensed temperature rise in the engine block 12 may cause the fan 50 to rotate at a faster speed to increase the airflow. Additionally, the direction of rotation of the fan 50 may be reversed based on the needs of the system. Such sensing being achieved by various techniques described below (temperature, airflow, time, etc.). For example, if it is sensed that the static cover 30 is plugged with debris obstructing the air intake openings 32, the fan 50 may be reversed from the engine-cooling mode to the debris-removal mode to direct air up, away from the engine block 12 and towards the static cover 30 to clear the collected debris. The timing of conversion of the fan 50 from the cooling mode to the debris-removal mode may be based on a variety of input, such as engine temperature, time, air flow volume, air flow rate, and/or when the engine is turned off.

Alternatively, the engine 10 may include both a blower fan coupled to the flywheel 18 (e.g., centrifugal fan 26) and a second fan not coupled to the flywheel 18 or crankshaft 14 (e.g., fan 50). This allows the blower fan to provide a minimum amount of airflow through the blower assembly 19 when the engine 10 is running and for the second fan to supplement this airflow as needed by operating in the cooling mode or to clear debris from the static screen 30 by operating in the debris-removal mode.

Figure 9:
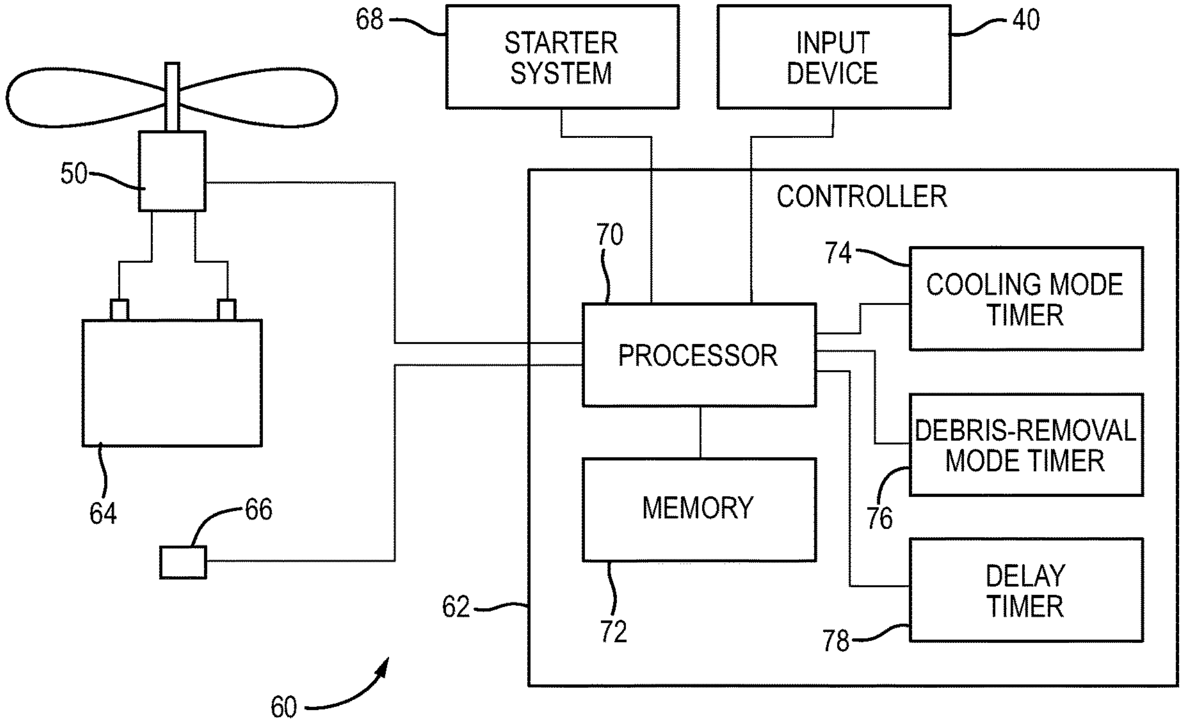
FIG. 9 is a block diagram of a control system for an electric fan of the engine for an air-cooled engine, according to an exemplary embodiment.

Referring now to FIG. 9, a control system 60 for the fan 50 is shown according to an exemplary embodiment. The control system 60 is configured to manage the operation of the fan 50 (e.g., speed, direction, on/off state, etc.) to achieve a desired cooling of the engine block 12 while keeping the air intake openings 32 of the static cover 30 generally free of accumulated debris. According to an exemplary embodiment, the control system 60 includes control circuitry 62, a power supply 64, and one or more sensors 66 monitoring the engine 10.

In some embodiments, the control circuitry 62 includes a processor 70 and a memory device 72. The processor 70 can be implemented as a general purpose processor, an application specific integrated circuit (ASIC), one or more field programmable gate arrays (FPGAs), a group of processing components, or other suitable electronic processing components. The memory device 72 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 72 may be or include volatile memory or non-volatile memory. The memory device 72 may include database components, object code components, script components, or any other type of information structure for supporting the various activities and information structures described in the present application. According to an exemplary embodiment, the memory device 72 is communicably connected to the processor via the processing circuit and includes computer code for executing (e.g., by processing circuit and/or processor) one or more processes described herein. In another exemplary embodiment, the control circuitry 62 is implemented as non-programmable circuitry, one or more circuit boards, or one or more linear circuits. "Non-programmable circuitry" consists of analog or digital hard circuitry that does not utilize a microcontroller or software. It is believed that embodiments in which the control circuitry is implemented as non-programmable circuitry including discrete components may be less expensive than embodiments implemented with microcontrollers or using software. Such non-programmable circuitry embodiments do not include a microcontroller. Non-programmable circuitry may include multiple discrete components that implement the various operations described herein.

The power supply 64 provides an on-board power source for the fan 50. According to an exemplary embodiment, the fan 50 is an electric fan and the power supply 64 is a device capable of providing an electric voltage to the fan 50, such as a battery (e.g., a lead-acid battery, nickel-cadmium battery, lithium polymer battery, lithium-ion battery, etc.) or an ultracapacitor. The fan 50 may be electrically coupled to the power system of a vehicle in which the engine 10 is installed and the power supply 64 may be device such as an onboard battery or an alternator coupled to the crankshaft that is configured to power other electrical systems (e.g., the engine starter motor, lights, gauges, etc.). In another embodiment, the power supply 64 may be a dedicated device providing power only to the fan 50 and the control system 60. According to another exemplary embodiment, the fan 50 may not be an electric fan and the power supply may store or provide power in another form, such as mechanically or via a hydraulic system.

The sensor 66 monitors the engine 10 such that the fan 50 may be utilized to maintain the engine 10 at a desired operating temperature. In one exemplary embodiment, the sensor 66 may be configured to sense the temperature of a portion of the engine 10 and may be a temperature sensor, such as a conventional oil temperature sensor, cylinder head temperature sensor, bi-metallic temperature sensor used for choking/governing, or dedicated temperature sensor(s) used solely for fan operation. In another exemplary embodiment, the sensor 66 may be configured to sense the airflow through the static screen and/or downstream of the fan 50 and may be an air flow sensor such as a vane meter sensor, hot wire sensor, membrane sensor, or may be a pressure sensor (e.g., a differential pressure sensor that measures the difference in pressure across the static cover 30). The control system 60 may include multiple sensors 66 positioned in various portions of the engine 10. The control circuitry 62 may further be configured to monitor other engine systems, such as the state of a starter system 68 for the engine 10.

According to one exemplary embodiment, the fan 50 is configured to operate in different modes based on a specified timing. For example, the control circuitry 62 may operate the fan 50 in the debris-removal mode for a first time and operate the fan 50 in the cooling mode for a second time. In some embodiments, the first time and the second time are not equal. The first time and the second time may be controlled by inputs from one or more timers (e.g., a cooling mode timer 74, a debris-removal timer 76), by one or more sensors (e.g. sensor 66), or by the user (e.g., via the user input device 40). For example, the fan 50 may be configured to operate in the debris-removal mode for a period of time when the engine 10 is initially turned on and then periodically for as long as the engine 10 is running (e.g., for 10 seconds every 3 minutes). The control circuitry 62 may include the cooling mode timer 74, the debris-removal mode timer 76, and a delay timer 78. When the engine 10 is started, the control circuitry 62 starts the fan 50 in the debris-removal mode and begins the debris-removal mode timer 76. Once the debris-removal mode timer 76 expires, the control circuitry 62 switches the fan 50 to operate in the cooling mode and starts the cooling mode timer 74. Once the cooling mode timer 74 expires, the control circuitry 62 switches the fan 50 to operate in the debris-removal mode again and starts the debris-removal mode timer 76, beginning the cycle again. When the engine 10 is stopped, the control circuitry 62 may immediately stop the fan 50 or may continue to operate the fan 50 in either the cooling mode or the debris-removal mode for a time period after the engine 10 is stopped.

In another embodiment, the control circuitry 62 normally operates the fan 50 in the cooling mode until a sensor input indicates an elevated temperature above a predetermined threshold, at which time the control circuitry 62 directs the fan 50 to operate in the debris-removal mode. For example, the fan 50 may run in the cooling mode until an elevated temperature in the engine block 12 is detected by the sensor 66 (e.g., due to an obstructed airflow and an insufficient flow of cooling air). The control circuitry 62 then switches the fan 50 to operate in the debris-removal mode. The control circuitry 62 may switch the fan 50 back to the cooling mode after a specified time (e.g., using the debris-removal mode timer 76 as described above). Alternatively, the control circuitry 62 may switch the fan 50 back to the cooling mode when the temperature drops below the previously mentioned threshold or when the temperature drops below a second, predetermined threshold lower than the first predetermined threshold.

In another embodiment, the control circuitry 62 normally operates the fan 50 in the cooling mode until a sensor input indicates an airflow below a predetermined threshold, at which time the control circuitry 62 directs the fan 50 to operate in the debris-removal mode. For example, the fan 50 may run in the cooling mode until a reduced airflow is detected by the sensor 66. The control circuitry 62 then switches the fan 50 to operate in the debris-removal mode. The control circuitry 62 may switch the fan 50 back to the cooling mode after a specified time (e.g., using the debris-removal mode timer 76 as described above) or once the sensor 66 detects that the airflow has exceeded a predetermined threshold indicating that the air intake openings 32 in the static cover 30 are unobstructed. Alternatively, the control circuitry 62 may switch the fan 50 back to the cooling mode when the airflow exceeds a second, predetermined threshold higher than the first predetermined threshold.

In the cooling mode, the control circuitry 62 may alter the behavior of the fan 50 to achieve a desired cooling of the engine block 12. In one embodiment, the fan 50 is a variable speed fan. The control circuitry 62 may adjust the speed of the fan 50 based on input from the sensor 66. For example, if the sensor 66 detects an increased temperature in the engine block 12, the control circuitry 62 may increase the speed of the fan to provide additional cooling air. The control circuitry 62 may switch the fan 50 to the debris-removal mode periodically (e.g., every three minutes) or based on input from the sensor 66 to clear any accumulated debris from the static cover 30. For example, the control circuitry 62 may compare a first sensed engine temperature taken at a lower fan speed to a second sensed engine temperature taken at a higher fan speed a specified time period after the first sensed temperature. If the second temperature is not lower that the first temperature, it may be determined that the static screen 30 is obstructed. The control circuitry 62 may then switch the fan 50 to operate in the debris-removal mode.

In another embodiment, the fan 50 may only be operated periodically. When the engine 10 is started, the control circuitry 62 starts the fan 50 in the cooling mode and starts the cooling mode timer 74. Once the cooling mode timer 74 expires, the control circuitry 62 turns the fan 50 off and starts the delay timer 78. Once the delay timer 78 expires, the control circuitry 62 turns the fan 50 on again in the cooling mode and starts the cooling mode timer 74, beginning the cycle again. The durations of the cooling mode timer 74 and the delay timer 78 may be static values, may be user configurable, or may be adjusted automatically based on input from the sensor 66. The on/off cycle may be interrupted periodically by the control circuitry 62 to switch the fan 50 to the debris-removal mode. The control circuitry 62 may switch the fan 50 to the debris-removal mode periodically (e.g., every three minutes) or based on input from the sensor 66 to clear any accumulated debris from the static cover 30. Alternatively, the control circuitry 62 may start the fan 50 in the debris-removal mode before intermittently operating the fan 50 in the cooling mode.

Figure 10:
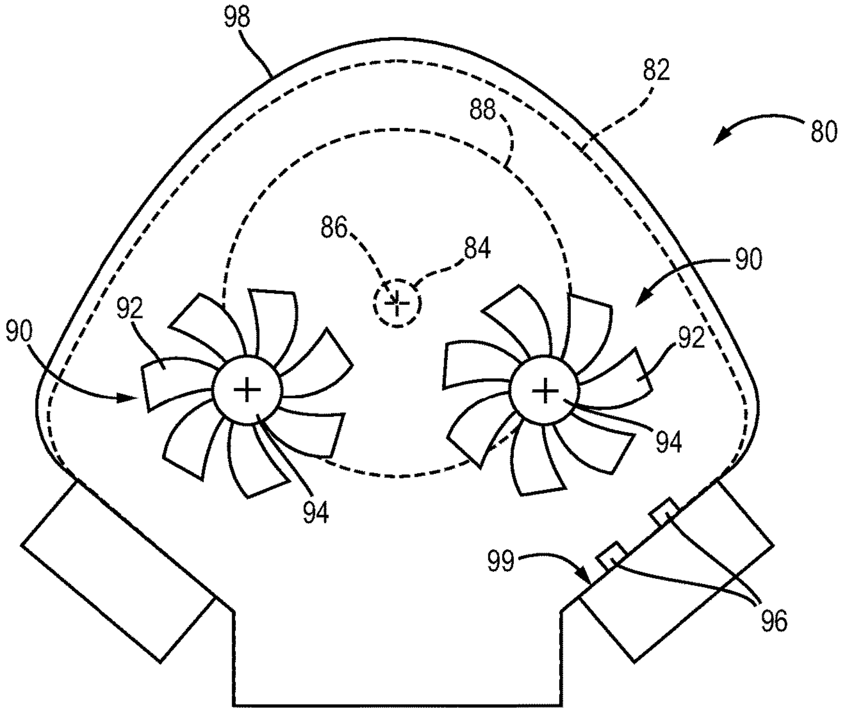
FIG. 10 is a schematic top view of an air-cooled internal combustion including multiple fans, according to an exemplary embodiment.

Referring to FIG. 10, in another embodiment, an engine 80 includes multiple fans 90 having fan blades 92 driven by electric motors 94. The use of multiple fans 90 allows the fans 90 to be smaller in size than the single fan 50 and allows the fans 90 to be placed at multiple locations on the engine, increasing space for other engine components or allowing for unique engine configurations. Because the fans 90 are not coupled to a flywheel 88 or a crankshaft 84 of the engine 80, the fans 90 may be positioned such that their respective axes of rotation are tilted or angled relative to an axis 86 of the crankshaft 84 and relative to each other. The fans 90 may therefore be independently positioned to maximize the cooling performance over various engine parts. According to an exemplary embodiment, the fans 90 may be positioned to maximize the cooling air provided to the individual cylinders 13 (e.g., positioned above each of the cylinder heads).

The fans 90 may both be controlled by a single control system, similar to the control system 60 described above. The single controller may control the multiple fans 90 independently or in parallel. In another embodiment, each of the fans 90 may be controlled by a separate, independent control system. The control system(s) may alter the direction of rotation of the fans 90 between a cooling mode and a debris-removal mode to provide sufficient cooling to the engine block 82 and to remove any accumulated debris from a static cover covering the fans 90.

According to still other exemplary embodiments, the engine 10 may be equipped with three or more fans. For example, the engine 10 may include three or more fans positioned above three or more cylinder heads to maximize the cooling air provided to the individual cylinders.

In configurations that do not require ignition trigger coils 96 to be located adjacent the flywheel 88 (e.g., electronic fuel injection systems), the exact placement of the ignition trigger coils 96 may be varied without adversely affecting the operation of the engine 80. Referring still to FIG. 10, according to an exemplary embodiment, the ignition trigger coils 96 of the engine 80 may be mounted at a location away from the flywheel 88, such as on an inside surface 99 of a blower housing 98 coupled to the engine 80. The ignition trigger coils 96 may be premounted to the blower housing 98 during the engine assembly process, saving assembly time and cost. The positioning of the ignition trigger coils 96 inside the blower housing 98 therefore not only protects the trigger coils 96 from debris and incidental contact during use of the engine 80, but also facilitates the assembly of the engine 80.

Figure 11:
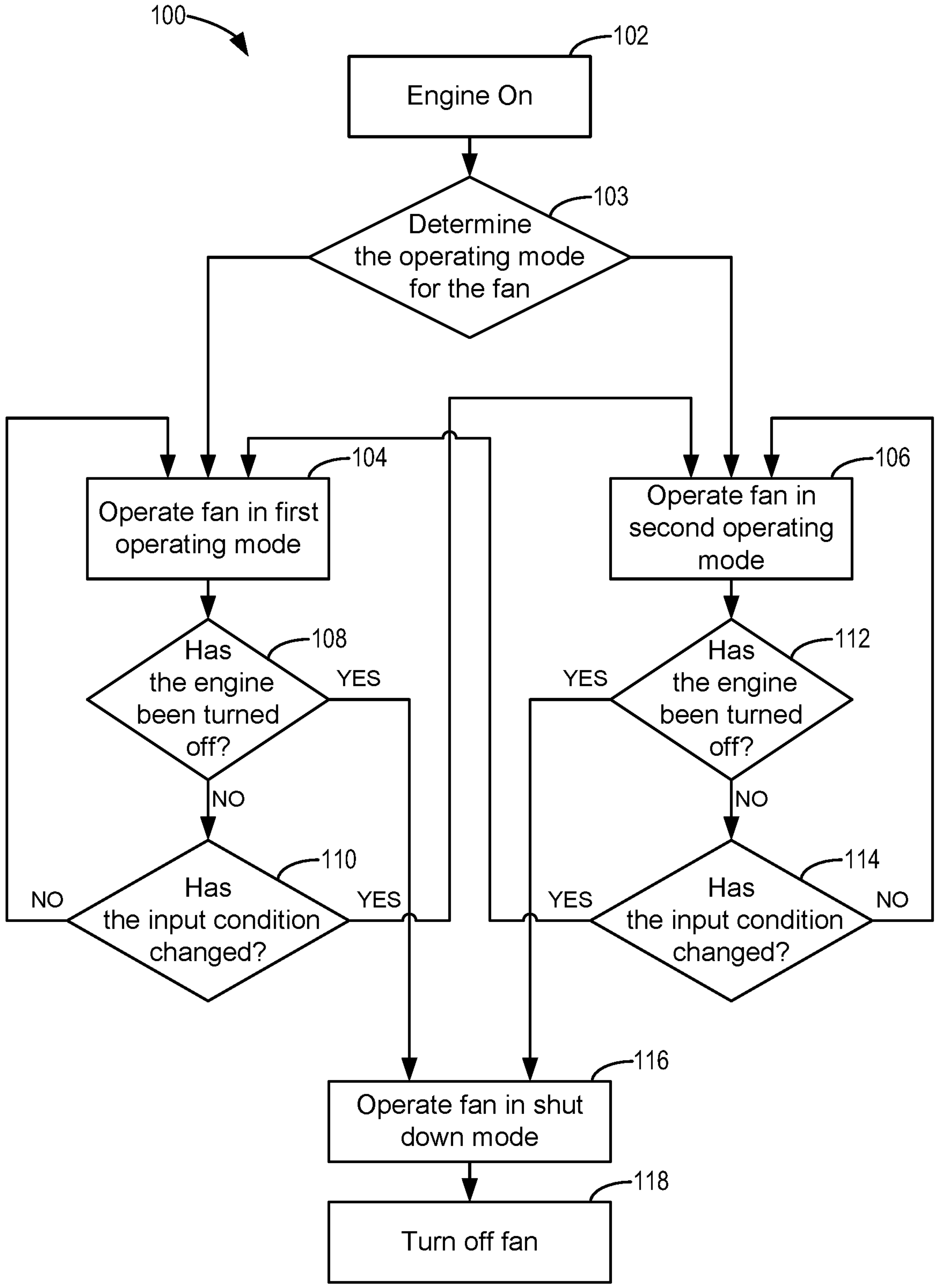
FIG. 11 is a flow chart illustrating a method of operating a fan for an air-cooled internal combustion engine, according to an exemplary embodiment.

Referring to FIG. 11, a method of operating a fan for an air-cooled internal combustion engine 100 is illustrated, according to an exemplary embodiment. When the engine (e.g., engine 10, engine 80) is first turned on or started (step 102), the control system determines in what operating mode the fan (e.g., fan 50, fans 90) is to run (step 103). The fan may be run such that is rotates in a first direction in a first operating mode (e.g., in a cooling mode) (step 104) or rotates in a second opposite direction in a second operating mode (e.g., in a debris-removal mode) (step 106). Which of the two operating modes is first used upon starting the engine can be predetermined (i.e., after starting engine always operate in the first mode or always operate in the second mode) or determined based on an input. In some embodiments, the input is provided by one or more sensors (e.g. sensor 66), for example, that the engine temperature is above or below a threshold temperature or that air flow is above or below a threshold air flow. In other embodiments, the input may be provided by a predetermined operating instruction or by a manual user input (e.g., via user input device 40).

With the fan being operated in the first operating mode, the control system monitors the state of the engine (step 108). If the engine is running, the control system monitors various input conditions related to the fan (step 110). The input condition is utilized to determine if the fan should operate in the first operating mode or the second operating mode. In some embodiments, the input condition is provided by a first operating mode timer (e.g., cooling mode timer 74). In some embodiments, the input conditions may be provided by one or more sensors (e.g., temperature sensors, airflow sensors, etc.) or a manual user input or activation. The fan remains in the first operating mode unless the input condition changes. A changing input condition may be, for example, the expiration of the first operating mode timer, a change in temperature beyond a predetermined threshold, a reduction in airflow below a predetermined threshold, a manual user input for changing modes, etc. If the input condition changes, the fan switches from the first operating mode to the second operating mode.

The control system continues to monitor the state of the engine (step 112) with the fan in the second operating mode. The control system also continues to monitor the input conditions related to the fan (step 114). In some embodiments, the input condition is provided by a second operating mode timer (e.g., debris-removal mode timer 76). In some embodiments, the input conditions may be provided by one or more sensors (e.g., temperature sensors, airflow sensors, etc.) or a manual user input or activation. The fan remains in the second operating mode unless the input condition changes. A changing input condition may be, for example, the expiration of the second operating mode timer, a change in temperature beyond a predetermined threshold, an increase in airflow above a predetermined threshold, a manual user input for changing modes, etc. If the input condition changes, the fan switches from the second operating mode to the first operating mode.

The control system continues to monitor the input condition to switch the fan between the first operating mode and the second operating mode until the engine is turned off. If the engine is turned off, the fan may operate in a shutdown mode (step 116) before turning off (step 118). In the shutdown mode, the fan may continue to operate for a predetermined amount of time in one of the operating modes, for a predetermined amount of time in one of the two operating modes and then for a predetermined amount of time in the other of the two operating modes, or in one of the two operating modes until receiving an input from a sensor (e.g., sensor 66), for example, that the engine temperature is below a threshold temperature indicating that the engine is cooled down or that air flow is above a threshold air flow indicating that debris has been removed from a static cover (e.g., static cover 30). The amount of time in which the fan operates in the shutdown mode may be determined by a first shutdown timer, by a second shutdown timer, by the first operating mode timer or the second operating mode timer. The second shutdown timer may be set for a different amount of time than the first shutdown timer. In other embodiments, the fan may not operate in either the first or the second operating modes in shutdown mode and may stop immediately when the engine is turned off.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of operating a fan for an air-cooled internal combustion engine including a blower assembly having a blower housing and a fan configured to move air through the blower housing, the method comprising:

starting the air-cooled internal combustion engine;

operating the fan in a first operating mode in which the fan rotates in a first direction;

operating the fan in a second operating mode in which the fan rotates in a second direction;

stopping the air-cooled internal combustion engine; and operating the fan in at least one of the first operating mode or the second operating mode after stopping the air-cooled internal combustion engine.

2. The method of claim 1, further comprising:

switching between the first operating mode and the second operating mode in response to a change in an input condition.

3. The method of claim 2, further comprising:

providing the input condition with a sensor.

4. The method of claim 3, further comprising:

providing the input condition with a temperature sensor.

5. The method of claim 3, further comprising:

providing the input condition with an air flow sensor.

6. The method of claim 2, further comprising:

providing the input condition with a timer.

7. The method of claim 2, further comprising:

providing the input condition with a combination of a sensor and a timer.

8. The method of claim 2, further comprising:

providing the input condition with a user-input device.

9. A method of operating a fan for an air-cooled internal combustion engine including a blower assembly having a blower housing and a fan configured to move air through the blower housing, the method comprising:

starting the air-cooled internal combustion engine;

determining if the fan operates in a first operating mode in which the fan rotates in a first direction or a second operating mode in which the fan rotates in a second direction;

upon operating the fan in one of the first operating mode or the second operating mode, monitoring an input condition while the air-cooled internal combustion engine is running;

detecting a change in the input condition and switching the fan from the one of the first operating mode or the second operating mode to another of the first operating mode or the second operating mode;

determining if the air-cooled internal combustion engine is turned off; and upon determining that the air-cooled internal combustion engine is turned off, operating the fan in a shutdown mode.

10. The method of claim 9, wherein monitoring the input condition comprises:

measuring a temperature, via a temperature sensor, of a portion of the air-cooled internal combustion engine.

11. The method of claim 10, wherein detecting the change in the input condition comprises:

detecting an increase in the temperature above a predetermined threshold.

12. The method of claim 9, wherein monitoring the input condition comprises:

measuring an air flow rate, via an air flow sensor, downstream of the fan or through a screen coupled to the blower housing.

13. The method of claim 12, wherein detecting the change in the input condition comprises:

detecting a decrease in the air flow rate below a predetermined threshold.

14. The method of claim 9, wherein monitoring the input condition comprises:

monitoring a timer.

15. The method of claim 14, wherein detecting the change in the input condition comprises:

detecting that the timer expired.

16. The method of claim 14, further comprising:

starting the timer when the air-cooled internal combustion engine starts.

17. A method of operating a fan for an air-cooled internal combustion engine including a blower assembly having a blower housing, a first fan configured to move air through the blower housing, and a second fan configured to move air through the blower housing, the method comprising:

starting the air-cooled internal combustion engine;

after starting the air-cooled internal combustion engine:

operating the first fan in a cooling mode where the first fan rotates in a first direction; and operating the second fan in a debris-removal mode where the second fan rotates in a second direction opposite to the first direction.

18. The method of claim 17, further comprising:

switching the first fan from the cooling mode to the debris-removal mode in response to:

a temperature of a portion of the air-cooled internal combustion engine reaching a predetermined temperature threshold;

an air flow downstream of the first fan or through a screen coupled to the blower housing decreasing to a predetermined airflow threshold; or a cooling mode timer expiring.

19. The method of claim 17, further comprising:

switching the second fan from the debris-removal mode to the cooling mode in response to:

a temperature of a portion of the air-cooled internal combustion engine decreasing below a predetermined temperature threshold;

an air flow downstream of the first fan or through a screen coupled to the blower housing increasing above a predetermined airflow threshold; or a debris-removal mode timer expiring.

* * * * *